Patented May 6, 1952

2,595,214

UNITED STATES PATENT OFFICE 2,595,214

POLYMERS OF ALLYL ALKYL CARBONATES

David E. Adelson and Hans Dannenberg, Berkeley, Calif., assignors to Shell Development Company, San Francisco, Calif., a corporation of Delaware No Drawing. Application December 2, 1946, Serial No. 713,467

12 Claims. (Cl. 260—77.5)

This invention relates to a new class of polymerizable compounds and to the polymers and copolymers thereof. More particularly the invention relates to allyl alkyl carbonates, to their polymerization and to the resulting polymers and copolymers.

More specifically the invention may be described as relating to the production of allyl alkyl carbonates and to the polymerization of the new compounds to form resinous products possessing the desired property of having a high degree of flexibility as well as a firm surface which enables the said polymers to be used for many industrial applications for which the prior art resins are inferior in performance or are entirely unsuited for the intended purpose.

Carbonic acid diesters of unsaturated monohydric alcohols are known in the art and have shown some promise in the production of resinous materials. However, many of the polymers of the known diesters of carbonic acid and the unsaturated monohydric alcohols are highly restricted in their use because of their undesirable property of becoming embrittled and undergoing spontaneous cracking when the product is hardened. Such resins cannot be used to produce articles requiring a flexible, firm surface such as, for example, phonograph records, glass substitutes, kitchen equipment, etc. A carbonic acid ester that can be polymerized to a resinous product having a flexible, firm surface would, therefore, be a highly desired advance in the art as the production costs of the polymers are relatively low and the resulting products can be used to produce many articles which are in great demand in industry.

It is an object of the invention to provide a new class of esters of carbonic acid capable of being polymerized to resins possessing the above-described properties. It is another object of the invention to provide polymers and copolymers of the new compounds which have a high degree of flexibility as well as a firm surface and can thus be used in many industrial applications requiring a high quality performance of the resinous product. Other objects of the invention will be apparent from the detailed description given hereinafter.

It has now been discovered that a new class of compounds termed allyl alkyl carbonates may be readily polymerized to resins having highly improved strength and flexibility which properties enable them to be used in many industrial applications in which the known resins are unsuited because of their soft or brittle nature. It has been further discovered that the allyl alkyl carbonates may be readily copolymerized with other unsaturated organic compounds to produce resinous material having the same desired properties as the above-described polymers and capable of being used for the same industrial purposes more fully described hereinafter.

The compounds with which the invention is concerned may be broadly described as allyl alkyl carbonates. More specifically they may be described as esters of carbonic acid consisting of carbonic acid molecules wherein one of the hydrogen atoms has been replaced by a radical derived by removing the hydroxyl group from a saturated alcohol and the remaining hydrogen atom is replaced by a radical derived by removing the hydroxyl group from an allyl-type alcohol. The compounds may be more fully described by the following structural formula

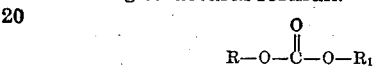

wherein R is an alkyl radical and $R_1$ an allyl-type radical.

By the term "allyl-type" radical as used throughout the specification is meant those radicals having an unsaturated linkage, preferably a double bond, between two carbon atoms of aliphatic character one of which is attached directly to a saturated carbon atom from which stems the free valence of the radical. The carbon atoms of aliphatic character are the carbon atoms in an open chain, for example, the carbon atoms in aliphatic radicals, and also the carbon atoms in cycloaliphatic rings, for example, the carbon atoms in the cyclohexyl and cyclohexenyl radicals. Allyl-type radicals have the structure

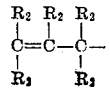

wherein each $R_2$ is the same or different substituent of the group comprising the hydrogen atom, a hydrocarbon radical or a heterocyclic radical. Especially advantageous are the radicals of this type having a terminal methylene group, i. e. radicals having the structure

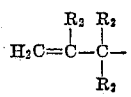

wherein each $R_2$ is the same or different substituent of the group comprising the hydrogen atom, a hydrocarbon radical or a heterocyclic radical.

Hydrocarbon radicals represented by $R_2$ in the above general formula of the allyl-type radicals are monovalent radicals which may have from 1 to 20 carbon atoms and may be saturated, unsaturated, cyclic, alicyclic or aromatic, such as the alkyl, alkenyl, aryl, alkaryl, alkenaryl, aralkyl, aralkenyl, cycloalkyl and cycloalkenyl radicals. Representative examples of the hydrocarbon radicals are methyl, ethyl, propyl, isopropyl, n-butyl, isobutyl, sec-butyl, tert-butyl, n-pentyl, isopentyl, sec-pentyl, hexyl, octyl, isooctyl, decyl, 2,3,5-trimethyl decyl, allyl, methallyl, methyl vinyl carbinyl, butenyl, pentenyl, hexenyl, phenyl, tolyl, naphthyl, anthryl, xylyl, 2-butylnaphthyl, 2,3-dipropylnaphthyl, cyclohexenyl, 3-vinylcyclohexenyl, 2,4,5-tributylcyclohexyl, cyclopentenyl, etc.

The radicals which $R_2$ may represent also include the heterocyclic radicals in which an oxygen, nitrogen, sulfur, etc., atom or atoms is included in the ring system. Examples of such radicals are furfuryl, thiophenyl, sulfolanyl, pyridinyl, etc.

Preferred allyl-type radicals represented by $R_1$ of the general structural formula of the compounds of the invention are those beta,gamma-unsaturated radicals containing from 3 to 18 carbon atoms and possessing at least one double bond for every six carbon atoms. Representative examples of the preferred allyl-type radicals are allyl, methallyl, methyl vinyl carbinyl, ethyl vinyl carbinyl, propyl vinyl carbinyl, ethallyl, propallyl, methyl isopropenyl carbinyl, ethyl isopropenyl carbinyl, isobutenyl carbinyl, cinnamyl 2,4 - hexadiene - yl - 1, 2,3 - butadiene-yl-1, 3,7-dimethyl-2,7-octadiene-yl-1, 2 - cyclohexene - yl-1, 2-cyclopentene-yl-1, etc. Such allyl-type radicals are derived practically or theoretically from allyl-type alcohols. Examples of the allyl-type alcohols from which the radicals may be derived are allyl alcohol, methallyl alcohol, ethallyl alcohol, 2-buten-1-ol, 2-hexen-1-ol, 3-methyl-2-buten-1-ol, 4,4-dimethyl-2-penten-1-ol, 4-phenyl-2-buten-1-ol, etc.

The R of the general structural formula for the allyl alkyl carbonates represents an alkyl radical. Preferred alkyl radicals are monovalent radicals having from 1 to 25 carbon atoms. Representative examples of the alkyl radicals are methyl, ethyl, propyl, isopropyl, butyl, isobutyl, sec-butyl, pentyl, isopentyl, hexyl, octyl, isooctyl, decyl, trimethyloctadecyl. Such radicals are derived practically or theoretically from saturated alcohols such as methyl alcohol, ethyl alcohol, n-butyl alcohol, sec-butyl alcohol, etc.

The following list contains a few representative examples of the allyl alkyl carbonates embraced by the invention:

Methyl allyl carbonate.
Methyl methallyl carbonate.
Ethyl allyl carbonate.
Ethyl ethallyl carbonate.
Butyl allyl carbonate.
Propyl 1,1-dimethyl-2-butenyl carbonate.
Pentyl 3-butenyl carbonate.
Ethyl 2,5-dimethyl-2-hexenyl carbonate.
Hexyl 1-methyl-2-propyl-2-pentenyl carbonate.
Decyl 2,4-hexadienyl carbonate.
2-methyl-4-propyl-hexyl 2-butenyl carbonate.

The allyl alkyl carbonates may be produced by any suitable method. The instability of carbonic acid, however, prevents its use in the production of the carbonates so that most of the methods will involve the use of a stable derivative of the acid. Suitable derivatives of carbonic acid that may be used in the production of the compounds of the invention are carbamic acid esters or salts, urea, urethane, carbonyl chloride, chloroformate, etc. One suitable method for the production of the carbonates, for example, is to treat carbonyl chloride with the desired alkyl alcohol to form the diester and then treat the dialkyl carbonate with the allyl alcohol under such conditions that there is an ester exchange of the allyl radical for one of the alkyl groups.

The more preferred method for the production of the allyl alkyl carbonates, however, is to treat an alkyl chloroformate with the desired allyl-type alcohol under the proper reaction conditions. Such a process is preferred because of its efficiency and relatively low cost. The alkyl chloroformate used in the reaction may be produced by the method disclosed in U. S. Patent No. 2,370,568. The procedure for the reaction of the alkyl chloroformate with the desired allyl-type alcohol is discussed in detail below. The reaction of the alkyl chloroformate with the allyl-type alcohol may be exemplified by the following equation showing the production of ethyl allyl carbonate from ethyl chloroformate and allyl alcohol

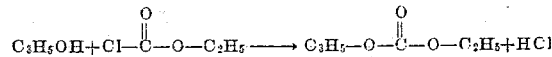

In the above reaction any variety of proportions of the reactants may be used. In general, however, it is more advantageous to use approximately equal molar quantities of both reactants or even a slight excess of the allyl-type alcohol. However, the reaction will proceed smoothly even in the presence of an excess of the chloroformate.

In the preferred process it is advisable to remove the hydrogen chloride as it is formed. This may be accomplished very conveniently by the addition of a basic substance such as pyridine, quinoline, dimethylaniline or an inorganic base as calcium hydroxide, sodium hydroxide, etc. in appropriate amounts, e. g. slightly greater molar quantity than the amount of the chloroformate being used.

The temperature at which the preferred reaction may be carried out may vary as required by the nature of the reacting substances. The more preferred temperature is below room temperature. The reaction proceeds particularly smooth when the temperature is maintained below 10° C. The lower temperature limit, however, should be above the freezing temperature of the reaction matter which in most cases will be above −25° C.

In most cases the reaction may be effectively carried out at atmospheric pressures, however subatmospheric or superatmospheric pressures may be employed if desired or necessary.

Although the reaction between the allyl-type alcohol and the chloroformate may be carried out without the addition of solvents, it may, in some cases, be advantageous to carry out the reaction in the presence of a mutual solvent. Such solvents provide a smoother reaction and decrease the production of by-products. Suitable solvents for the reaction medium are, for example, chloroform, ethylene dichloride, trichloroethane, monochlorobenzene, monochlorotoluene, dioxane, benzyl chloride, hexane, pentane, etc., and mixtures thereof.

Upon completion of the reaction the allyl alkyl carbonate is separated from the reaction mixture, which will generally include the excess if any of the reactants, the solvent and the hydrogen chloride absorbent, by any suitable means comprising such steps as, for example, distillation, washing, solvent extraction, filtration, and the like.

The reaction is executed in any convenient type of apparatus enabling intimate contact of the reactants and control of operating conditions. The process may be carried out in batch, semi-continuous or continuous operation. When a continuous operation is employed, reactants continuously withdrawn from the reaction zone are preferably subjected to a substantially continuous product separating operation under conditions enabling the continuous recycling to the reaction zone of separated unreacted materials.

The monomeric allyl alkyl carbonates produced by the preferred method described hereinabove have found many important industrial applications. They can, for example, be used as plasticizers, tackifiers, lubricants and as intermediates in the synthesis of a large number of other valuable chemical compounds.

The monomeric allyl alkyl carbonates of the invention are also of value in that they may be readily polymerized singly or with another allyl alkyl carbonate in a variety of proportions to form tough, flexible resinous materials which may be used in production of castings, laminates, etc., which are in many ways superior to the resinous products now produced in the art.

Another of the most important uses of the allyl alkyl carbonates is their copolymerization with other unsaturated organic compounds such as the allyl-type and vinyl-type esters and ethers to produce resins having improved toughness and flexibility and general resistance to deteriorating influences that make them ideal industrial resins capable of being molded, cast, lathed and used in the production of laminates and objects of all shapes and sizes.

A group of the unsaturated organic compounds with which the allyl alkyl carbonates may be copolymerized are the mono-ethylenic compounds, which contain a single polymerizable carbon-to-carbon double bond, of which an important subclass consists of those compounds containing in the molecule a terminal methylene group attached to carbon by an ethylenic double bond $CH_2=C<$. Examples of this class of compounds are styrene, alpha-methyl styrene, many vinyl and allyl derivatives, and the nitriles and many of the esters of acrylic and alpha-substituted acrylic acids.

Another group of copolymerizable compounds consists of those compounds having two or more conjugated carbon-to-carbon double bonds, such as butadiene and substituted butadiene, as well as polymers of acetylene, such as vinyl and divinyl acetylene. Others are unsaturated cyclic compounds such as courmarone, indene, furfural and cyclohexene.

Some of the most important copolymerizable compounds, however, have two or more polymerizable non-conjugated double bonds. An important sub-class consists of the unsaturated aliphatic poly-esters of saturated polybasic acids, examples of which are divinyl, diallyl, and dimethallyl esters of oxalic, malonic, citric and tartaric acids. Another subclass consists of the unsaturated aliphatic polyethers of saturated polyhydric alcohols, such as the divinyl, diallyl and dimethallyl ethers of glycol, diethylene glycol, trimethylene glycerol and similar derivatives of diglycerol, mannitol, sorbitol, and the like.

Another subclass consists of the unsaturated aliphatic organic acid poly-esters of polyhydric alcohols, such as acrylic and methacrylic poly-esters of glycol. Another subclass consists of the unsaturated aliphatic alcohol esters of the unsaturated aliphatic acids, such as the vinyl, allyl and methallyl esters of acrylic, methacrylic and the like. Still another class consists of the unsaturated poly-esters of dibasic aromatic acids, such as divinyl, diallyl and dimethallyl esters of phthalic acid, isophthalic acid, and the naphthalene dicarboxylic acids. Instead of the esters and ethers, the corresponding sulfur and nitrogen compounds, i. e. thio-esters, thio-ethers, amides and amines may be used.

The allyl alkyl carbonates and the above-described unsaturated organic compounds which may be used to produce the copolymers of the invention may be in the monomeric state or may be partially polymerized prior to being copolymerized with the other component or components. By the term "partially polymerized" as used throughout the specification and appended claims is meant any state of polymerization existing between the monomeric state and the state of substantially complete polymerization. The partial polymerization of the monomeric allyl alkyl carbonates and the unsaturated organic compounds may be accomplished by commencing the polymerization process according to the method described hereinbelow for the production of the resins and interrupting the process at any time short of its completion.

The proportions of the allyl alkyl carbonate and the other unsaturated organic compound with which it is to be copolymerized will vary over a wide range depending upon the specific reactants and the type of product desired. Resinous products having improved flexibility and hardness of surface are obtained when the amount of the allyl alkyl carbonate to be used varies within the range of 10% to about 90% by weight of the total reactants and the other unsaturated organic compound varies within the range of 90% to about 10% by weight of the total reactants. Resinous products having exceptionally fine properties with particularly fine flexibility and firmness of surface are obtained when the amount of the allyl alkyl carbonate incorporated in the copolymer varies within the range of 45% to about 55% of the total weight of the reactants, preferably about 50% of the total weight of the reactants and the unsaturated organic compound making up the other 55% to about 45% of the total weight. The specific amount of the reactants to be used to bring out the desired properties, however, can readily be determined for each individual case.

The allyl alkyl carbonates, alone or when incorporated with other unsaturated organic compounds, may also be polymerized in the presence of already-formed plastics, including natural resins, cellulose derivatives and synthetic resins. Other modifiers, including plasticizers, stabilizers, lubricants, dyes, pigments and fillers, may be added to the monomers or mixtures thereof prior to polymerization or may be added during the polymerization process provided they do not chemically react with or otherwise adversely affect the ingredients of the reaction mixture. Otherwise, these modifiers may be added following polymerization. The nature and amount of the modifiers used will depend upon the particular allyl alkyl carbonate involved, upon the method of polymerization and upon the intended use of the product.

The allyl alkyl carbonates may be polymerized alone or may be copolymerized with the above-described unsaturated organic compounds or may be polymerized in the presence of the above-described modifying agents according to the conditions described hereinbelow. The term "polymerization" used below refers both to the polymerization process and the copolymerization process.

The compounds may be polymerized in bulk in the presence or absence of a solvent or diluent. If a solvent is used the substance may be a solvent for the reactants and polymer, or may be a solvent for the reactants and a non-solvent for the polymer. Emulsifying, granulating and wetting agents may also be present. It is also possible to effect polymerization by atomizing the reactants or a solution thereof in the form of a fine spray into a heated chamber containing an inert gas. It is likewise feasible to polymerize the novel compounds of the invention dispersed in the interstices in the fibrous material such as a fabric.

Polymerization is usually energized by the application of heat, although both heat and light may be used, and in some cases, light is sufficient. Temperatures between about 60° C. and about 150° C. are preferred, although higher or lower temperatures can be used. Continuous or discontinuous processes may be used. Atmospheric, reduced, or superatmospheric pressures may be used. Polymerization may be carried out under a blanket of an inert gas such as nitrogen or carbon dioxide.

Catalysts may be added to hasten the polymerization. The preferred catalysts are those which are soluble in the polymerizable material. Benzoyl peroxide has been found very satisfactory. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides such as tertiary butyl hydroperoxide, peracetic acid, perphthalic acid, sodium perborate, sodium persulfate, etc. If desired, mixtures of polymerization catalysts can be used. The amount of the catalyst used will vary under the various conditions but ordinarily will be between about 0.01% and about 5% by weight of material being polymerized, although it is not necessarily limited to this range. In some cases it may be desirable to conduct the polymerization in the concurrent presence of both a catalyst and an inhibitor of polymerization for the purpose of controlling the rate thereof or of producing a product of certain desired properties.

The polymerization reaction can be carried to completion without substantial interruption or it may be stopped at any point short of completion. Incomplete polymerization may be used for the production of a syrup which may be further worked and eventually substantially completely polymerized. The syrup may, for instance, be transferred to a mold of any desired configuration and again subjected to polymerization conditions, or it may be used in coating operations, or in impregnating bibulous, e. g. fibrous material which in turn may be used in the production of laminates. Unreacted monomer may be separated from its mixture with the polymer by solvent extraction, distillation or other methods. The separated polymer may then be worked up in any known or special manner.

Because of their desired properties the resinous products of the invention find a great many industrial applications. Their properties make them particularly useful in the production of laminates of cloth, wood, paper, etc. They are also useful as interlayers or adhesives in the production of safety glass. Thin films of some of the resins having the required tensile strength and flexibility find use in the production of wrapping tissue. Other properties of the resins make them valuable as adherent coatings, deposited from lacquers, paints and enamels containing them. Other resinous products are used as textile assistants in the manufacture of cloth, lubricating, sizing and creasing-proofing the material in some instances. Still others of the resins of the invention may be used to produce various shaped articles such as cups, beakers, boxes, buttons. Others may be used to produce phonograph records, glass substitutes and many other articles requiring a high flexibility.

To illustrate the manner in which the invention may be carried out the following examples are given. It is to be understood, however, that the examples are for the purpose of illustration and the invention is not to be regarded as limited to the specific allyl alkyl carbonate being prepared or polymerized or the particular unsaturated organic compound with which it is being copolymerized.

Example I

Approximately one part of dry allyl alcohol was added to about 1.1 parts of pyridine and about 2.5 parts of redistilled chloroform and the mixture cooled to —18° C. Approximately one part of ethyl chloroformate was diluted with about 1.5 parts of chloroform and the mixture was added dropwise to the allyl alcohol-pyridine solution. The temperature of the final solution was held between —18° C. and 5° C. until the reaction was substantially complete and then allowed to remain at room temperature for 12 hours. The chloroform layer was washed with dilute hydrochloric acid, water, then dried and distilled. The products recovered were chloroform and about .8 parts of ethyl allyl carbonate. The ethyl allyl carbonate boiled at 148.9–149.1° C. at 760 mm. Hg pressure; $n$-20/D 1.4092; $d$-23/4 0.987; molecular refraction 32.6 (calcd. 32.74). 81.5% yield based on ethyl chloroformate.

The ethyl allyl carbonate produced above was polymerized by refluxing the material in a bulb type condenser over which nitrogen was being passed. The substance was heated at about 150° C. without the presence of a catalyst. At the end of the 15 day polymerization period a yield of about 70% of a firm, clear, slightly yellow, flexible polymer was obtained.

The ethyl allyl carbonate was also polymerized by subjecting the compound to heat at 65° C. and in the presence of 2% benzoyl peroxide. At the end of 5 days' heating a firm, clear, flexible resin had been obtained.

Example II

Approximately one part of dry allyl alcohol was added to about 1.1 parts of pyridine and about 2.5 parts of redistilled chloroform and the mixture cooled to —18° C. About one part of methyl chloroformate was diluted with about 1.5 parts of chloroform and the mixture was added dropwise to the allyl alcohol-pyridine solution. The temperature of the final solution was held between —18° C. and 5° C. until the reaction was substantially complete and then allowed to remain at room temperature for 12 hours. The chloroform layer was then washed with dilute hydrochloric acid, water, dried and distilled. The products recovered were chloroform and methyl allyl carbonate. The methyl allyl carbonate boiled at 131.4–132.4° C. at 760 mm. pressure; n-20/D 1.4068; d-20/4 1.0261; 78.3% yield based on the methyl chloroformate.

The methyl allyl carbonate produced above was heated in an oven in the presence of air at 65° C. with about 2% benzoyl peroxide for a period of 10 days. At the end of that period a firm, clear, flexible resin had been obtained.

*Example III*

Diallyl oxalate polymerizes to a very brittle resin. Ethyl allyl carbonate was copolymerized with the diallyl oxalate in various proportions as indicated in the table below. The polymerization was accomplished with 2% benzoyl peroxide at 65° C.

| Per Cent Diallyl Oxalate | Per Cent Ethyl Allyl Carbonate | Polymer |
| --- | --- | --- |
| 75 | 25 | Hard, flexible resin. |
| 50 | 50 | Hard, clear resin. |
| 25 | 75 | Hard, flexible resin. |

*Example IV*

Ethyl allyl carbonate was copolymerized with diallyl carbonate in the proportions indicated in Example II above. The polymerization was accomplished with 2% benzoyl peroxide at 65° C. and continued for approximately 5 days. Hard, clear, flexible resins were obtained in each of the cases.

*Example V*

About one part of methallyl alcohol is added to about 1.1 parts of pyridine and about 2.5 parts of redistilled chloroform and the mixture cooled to about −20° C. Approximately one part of butyl chloroformate is diluted with about 1.5 parts of chloroform and the mixture is added dropwise to the methallyl alcohol-pyridine solution. The temperature of the final solution is held between −20° C. and 5° C. until the reaction is substantially complete and then allowed to remain at room temperature over night. The chloroform layer is then washed with dilute hydrochloric acid, water, dried and distilled. The products recovered are chloroform and butyl methallyl carbonate.

About 10 parts by weight of butyl methallyl carbonate produced above are polymerized with about 90 parts by weight of diallyl phthalate at 65° C. with 2% benzoyl peroxide for 10 days to form a clear, flexible, hard resin.

About 50 parts by weight of butyl methallyl carbonate are polymerized with about 50 parts by weight of diallyl diglycolate at 65° C. with 2% benzoyl peroxide for 5 days to form a tough, clear resin.

*Example VI*

According to the procedure described in Example V, propyl 1,1-dimethyl-2-butenyl carbonate is produced by reacting 1,1-dimethyl-2-buten-1-ol with propyl chloroformate in the presence of pyridine. Pentyl 2-butenyl carbonate is produced by reacting 2-buten-1-ol with pentyl chloroformate in the presence of pyridine. Hexyl 1-methyl-2-propyl-2-pentenyl carbonate is produced by reacting 1-methyl-2-propyl-2-penten-1-ol with hexyl chloroformate. Octyl ethallyl carbonate is produced by treating ethallyl alcohol with octyl chloroformate in the presence of pyridine.

The allyl alkyl carbonates so produced are polymerized singly to produce resins having the desired properties.

We claim as our invention:

1. A copolymer of about 10% to about 90% of butyl methallyl carbonate and about 90% to about 10% of diallyl phthalate.
2. A polymer of ethyl allyl carbonate.
3. A copolymer of about 10% to about 90% of methyl allyl carbonate and about 90% to about 10% of diallyl carbonate.
4. A copolymer of 75% to 25% ethyl allyl carbonate and 25% to 75% diallyl oxalate.
5. A resin comprising a polymer of methyl allyl carbonate.
6. A polymer of an unsaturated carbonic acid ester which ester consists of the carbonic acid molecule wherein one of the hydrogen atoms has been replaced by the ethyl radical and the other hydrogen atom has been replaced by a radical derived by removing the hydroxyl group from an aliphatic, mono-olefinic, monohydric alcohol containing from 3 to 18 carbon atoms wherein one of the carbon atoms in the olefinic linkage is joined to a saturated carbinol group.
7. A polymer of an unsaturated carbonic acid ester which ester consists of the carbonic acid molecule wherein one of the hydrogen atoms has been replaced by a radical derived by removing the hydroxyl group from a saturated, monohydric, aliphatic alcohol containing from 1 to 25 carbon atoms, and the other hydrogen atom has been replaced by a radical derived by removing the hydroxyl group from an aliphatic, mono-olefinic, monohydric alcohol containing from 3 to 18 carbon atoms wherein one of the carbon atoms in the olefinic linkage is joined to a saturated carbinol group.
8. A resin comprising a copolymer of (I) 10% to 90% of an unsaturated carbonic acid ester which ester consists of the carbonic acid molecule wherein one of the hydrogen atoms has been replaced by a radical derived by removing the hydroxyl group from a saturated, monohydric, aliphatic alcohol containing from 1 to 25 carbon atoms, and the other hydrogen atom has been replaced by a radical derived by removing the hydroxyl group from an aliphatic, mono-olefinic, monohydric alcohol containing from 3 to 18 carbon atoms wherein one of the carbon atoms in the olefinic linkage is joined to a saturated carbinol group, and (II) 90% to 10% of an organic polymerizable compound containing at least one $CH_2=C<$ group within its molecule.
9. A polymer of an unsaturated carbonic acid ester which ester consists of the carboxylic acid molecule wherein one of the hydrogen atoms has been replaced by a radical derived by removing the hydroxyl group from a saturated, monohydric, aliphatic alcohol containing from 1 to 25 carbon atoms, and the other hydrogen atom has been replaced by $-CH_2-CH=CH_2$ radical.
10. A polymer of (I) 10% to 90% of an unsaturated carbonic acid ester consisting of the carbonic acid molecule wherein one of the hydrogen atoms has been replaced by a radical derived by removing the hydroxyl group from a saturated, monohydric, aliphatic alcohol containing from 1 to 25 carbon atoms, and the other hydrogen atom has been replaced by the $-CH_2-CH=CH_2$ radical, and (II) 90% to 10% of an organic polymerizable compound containing at least one $CH_2=C<$ group in its molecule.

11. A copolymer as defined in claim 10 wherein the organic polymerizable compound is a polyester of an ethylenically unsaturated aliphatic monohydric alcohol and a saturated polybasic acid.

12. A copolymer as defined in claim 10 wherein the organic polymerizable compound is a polyester of an ethylenically unsaturated monohydric alcohol and a dibasic aromatic acid.

DAVID E. ADELSON.
HANS DANNENBERG.

REFERENCES CITED

The following references are of record in the file of this patent:

UNITED STATES PATENTS

| Number | Name | Date |
|---|---|---|
| 2,073,363 | Carothers | Mar. 9, 1937 |
| 2,370,549 | Kung | Feb. 27, 1945 |
| 2,374,081 | Dean | Apr. 17, 1945 |
| 2,377,111 | Strain et al. | May 29, 1945 |
| 2,384,115 | Muskat et al. | Sept. 4, 1945 |
| 2,402,481 | Adelson et al. | June 18, 1946 |

FOREIGN PATENTS

| Number | Country | Date |
|---|---|---|
| 650,100 | France | Sept. 11, 1928 |
| | (1st addition to No. 650,100) | |
| 34,412 | France | Jan. 12, 1929 |

OTHER REFERENCES

Berichte der deutschen chemischen Gesellschaft, vol. 62, pages 858 (1929).